United States Patent
Patel et al.

(10) Patent No.: US 10,879,772 B2
(45) Date of Patent: Dec. 29, 2020

(54) ROTATING RESISTOR ASSEMBLIES

(71) Applicant: Hamilton Sundstrand Corporation, Charlotte, NC (US)

(72) Inventors: Dhaval Patel, Loves Park, IL (US); Edward C. Allen, Davis, IL (US); Andrew R. Wilkinson, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 93 days.

(21) Appl. No.: 16/242,930

(22) Filed: Jan. 8, 2019

(65) Prior Publication Data

US 2020/0220433 A1   Jul. 9, 2020

(51) Int. Cl.
| | | |
|---|---|---|
| *H02K 11/00* | (2016.01) | |
| *H01C 1/02* | (2006.01) | |
| *H01C 13/02* | (2006.01) | |
| *H02K 7/00* | (2006.01) | |
| *H02K 11/042* | (2016.01) | |
| *H02M 7/00* | (2006.01) | |

(52) U.S. Cl.
CPC ........... *H02K 11/0094* (2013.01); *H01C 1/02* (2013.01); *H01C 13/02* (2013.01); *H02K 7/003* (2013.01); *H02K 11/042* (2013.01); *H02M 7/003* (2013.01)

(58) Field of Classification Search
CPC .. H02K 11/0094; H02K 11/042; H02K 7/003; H01C 13/02; H01C 1/02; H01C 10/34; H02M 7/003
USPC .................................................. 310/68 D, 71
See application file for complete search history.

(56) References Cited

U.S. PATENT DOCUMENTS

| | | | | |
|---|---|---|---|---|
| 4,794,510 A | * | 12/1988 | Wege ..................... | H02M 7/003 310/68 D |
| 5,065,484 A | * | 11/1991 | Pinchott ................ | H01L 25/112 29/25.02 |

(Continued)

FOREIGN PATENT DOCUMENTS

EP    2773031 A2    9/2014

OTHER PUBLICATIONS

Extended European search report issued in corresponding EP Application No. 19209828.3, dated May 18, 2020.

*Primary Examiner* — Tulsidas C Patel
*Assistant Examiner* — Ahmed Elnakib
(74) *Attorney, Agent, or Firm* — Locke Lord LLP; Daniel J. Fiorello; Scott D. Wofsy

(57) ABSTRACT

A rotating resistor assembly for use in a rotating shaft of an electrical machine can include a first housing configured to contact the rotating shaft and be grounded to the rotating shaft. The first housing can include a first bus bar connection aperture configured to receive a first bus bar. The assembly can include a second housing configured to connect to the first housing. The second housing can be configured to be insulated from the rotating shaft and to be insulated from direct electrical connection with the first housing. The second housing can include a second bus bar connection aperture configured to receive a second bus bar. The assembly can include a suppression resistor disposed between the first housing and the second housing and in electrical communication with the first housing and the second housing to provide an electrical pathway between first housing and the second housing.

17 Claims, 3 Drawing Sheets

(56) References Cited

U.S. PATENT DOCUMENTS

| | | | | |
|---|---|---|---|---|
| 5,587,616 A * | 12/1996 | Johnsen | ............... | H02K 11/042 |
| | | | | 310/61 |
| 7,586,224 B2 * | 9/2009 | Osborn | ............... | H02K 11/042 |
| | | | | 310/68 D |
| 7,868,494 B2 | 1/2011 | Grosskopf et al. | | |
| 7,944,100 B2 | 5/2011 | Lemmers, Jr. et al. | | |
| 8,724,324 B2 | 5/2014 | Ford et al. | | |
| 9,035,508 B2 | 5/2015 | Grosskopf et al. | | |
| 9,154,046 B2 | 10/2015 | Krause et al. | | |
| 9,257,886 B2 | 2/2016 | Pal | | |
| 9,312,742 B2 * | 4/2016 | Grosskopf | ........... | H02K 11/028 |
| 9,369,029 B2 | 6/2016 | Hasan et al. | | |
| 9,490,674 B2 | 11/2016 | Chitsaz et al. | | |
| 9,590,477 B2 | 3/2017 | Chitsaz et al. | | |
| 10,103,604 B2 | 10/2018 | Chitsaz et al. | | |
| 10,460,861 B1 * | 10/2019 | Patel | ........................ | H01C 1/02 |
| 2013/0300231 A1 * | 11/2013 | Grosskopf | ............. | H02K 11/27 |
| | | | | 310/71 |
| 2014/0226383 A1 | 8/2014 | Brust et al. | | |
| 2014/0241020 A1 * | 8/2014 | Krause | ................. | H02K 11/042 |
| | | | | 363/126 |
| 2018/0316248 A1 * | 11/2018 | Patel | .................... | H02K 11/042 |

\* cited by examiner

ROTATING RESISTOR ASSEMBLIES

BACKGROUND

1. Field

This disclosure relates to rotating resistor assemblies, e.g., for use in a shaft of a generator.

2. Description of Related Art

Certain generators take advantage of three stages, including a permanent magnet stage, an exciter stage, and a main stage. The exciter stage can include an exciter stator winding for receiving DC power that energizes the exciter stator and generates a magnetic field. Rotational energy provided by the shaft causes the exciter rotor to move through the magnetic field, resulting in the generation of alternating current (AC) electric power in the exciter rotor. A rotating rectifier assembly can be mounted within the rotor for converting the AC power to a direct current (DC) electric power that is supplied to the main rotor winding. The DC power provided to the rotating main rotor winding results in a rotating magnetic field that generates AC power in the stator windings of the main stage producing power output.

In order for the rotating rectifier to be connected to the main field of the rotor, the assembly requires a connection assembly. Thus certain systems include a rotating resistor assembly within the shaft electrically connected to the rotating rectifier to act as the connection assembly. Existing rotating resistor assemblies include many components and include certain components that are manufactured from a solid bar of beryllium copper, which is both environmentally hazardous and costly. Additionally, existing rotating resistor assemblies require that the main field leads be soldered to the rotating resistor assembly, which creates a structural weak point in the generator. Existing systems also use a high impedance resistor used to provide a grounding path in the rotor, and this is traditionally a ceramic resistance and prone to cracking which can break the grounding path.

Such conventional methods and systems have generally been considered satisfactory for their intended purpose. However, there is still a need in the art for improved rotating resistor assemblies. The present disclosure provides a solution for this need.

SUMMARY

A rotating resistor assembly for use in a rotating shaft of an electrical machine can include a first housing configured to contact the rotating shaft and be grounded to the rotating shaft. The first housing can include a first bus bar connection aperture configured to receive a first bus bar. The assembly can include a second housing configured to connect to the first housing. The second housing can be configured to be insulated from the rotating shaft and to be insulated from direct electrical connection with the first housing. The second housing can include a second bus bar connection aperture configured to receive a second bus bar. The assembly can include a suppression resistor disposed between the first housing and the second housing and in electrical communication with the first housing and the second housing to provide an electrical pathway between first housing and the second housing.

The first housing can be made of metal or any other suitable material. For example, the first housing can be made of aluminum. The first housing can be uncoated, for example.

The second housing can be made of metal and can include a coating such that direct contact with the shaft (and/or the first housing) does not electrically connect the shaft to the second housing (and/or the second housing to the first housing). The metal can be aluminum and the coating is a dielectric. Any other suitable material for the second housing (e.g., uncoated ceramic) and/or any coating thereof is contemplated herein.

An insulating washer can be disposed between and in contact with the first housing and the second housing, e.g., to at least provide abrasion resistance to protect the coating of the second housing (and/or additional electrical insulation). The insulating washer can be made of polyimide film.

The second housing can include a radial aperture defined from a center of the second housing to an outer surface of the second housing. The first housing can include a tab extending axially therefrom. The tab can define the first bus bar connection aperture and can be configured to insert into the radial aperture of the second housing, e.g., to axially align the first bus bar aperture and the second bus bar aperture.

The suppression resistor can be at least partially (e.g., fully) encased within the first housing and the second housing. The suppression resistor can be a ceramic hollow cylinder. The assembly can include a first bus bar disposed in the first bus bar aperture and a second bus bar inserted in the second bus bar aperture.

A rotor assembly for an electrical machine can include a rotor, a rectifier diode pack disposed in the rotor, and a rotating resistor assembly disposed in the rotor and in electrical communication with the rectifier diode pack. The rotating resistor assembly can be any suitable assembly as disclosed herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figures 1, 2:
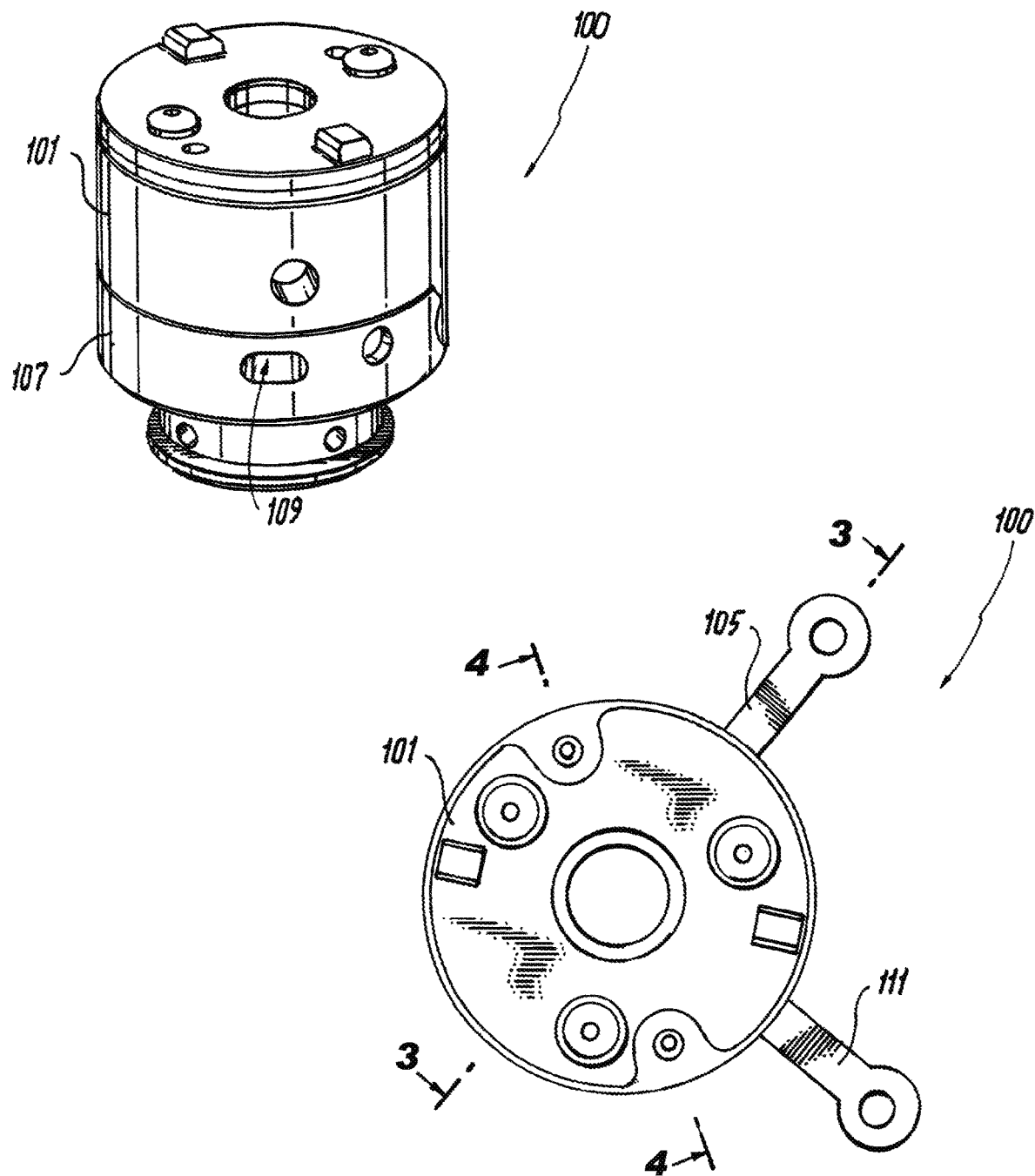
FIG. 1 is a perspective view of an embodiment of a rotating resistor assembly in accordance with this disclosure.
FIG. 2 is a plan view of the embodiment of FIG. 1.
Figure 3:
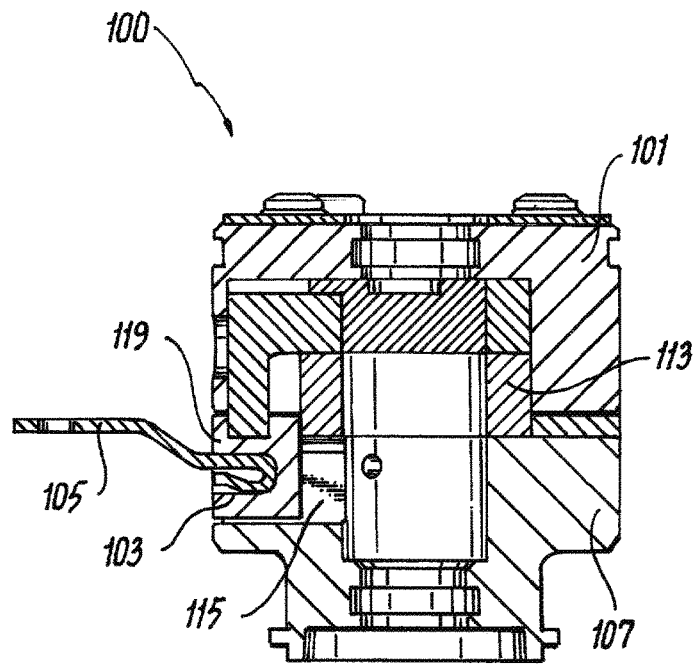
FIG. 3 is a cross-sectional view of the embodiment of FIG. 1, sectioned along line 3-3 of FIG. 2.
Figure 4:
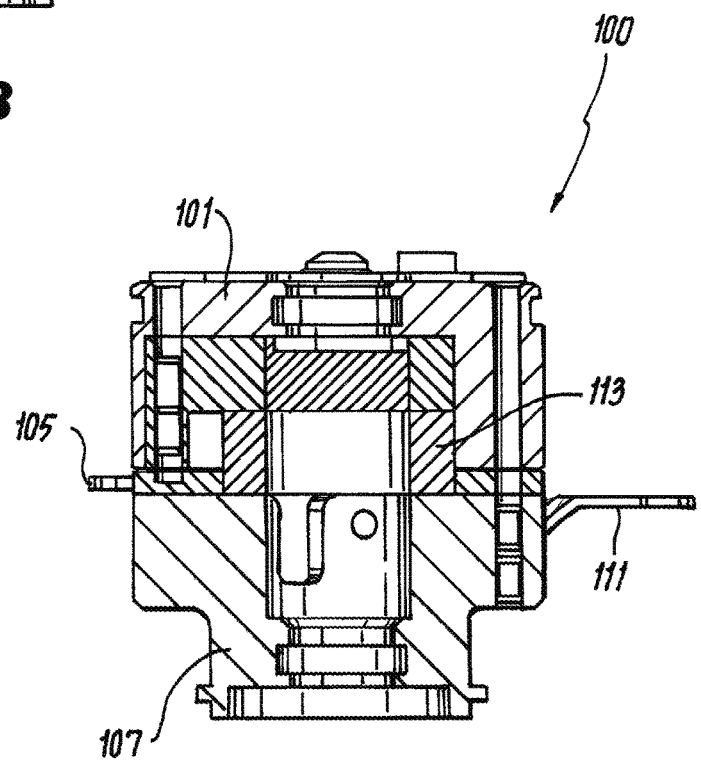
FIG. 4 is a cross-sectional view of the embodiment of FIG. 1, sectioned along line 4-4 of FIG. 2.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 2-5. Certain embodiments described herein can be used as a resistor assembly for an electrical machine having rotating diodes, for example, or for any other suitable use.

Referring to FIGS. 1-5, a rotating resistor assembly 100, e.g., for use in a rotating shaft (not shown) of an electrical machine can include a first housing 101 configured to contact the rotating shaft and be grounded to the rotating shaft. The first housing 101 can include a first bus bar connection aperture 103 configured to receive a first bus bar (e.g., first bus bar 105 as shown).

The assembly 100 can include a second housing 107 configured to connect to the first housing 101 (e.g., via one or more fasteners 108 inserted through first housing 101 as shown, and/or in any other suitable manner). The second housing 107 can be configured to be insulated from the rotating shaft and to be insulated from direct electrical connection with the first housing 101. The second housing 107 can include a second bus bar connection aperture 109 configured to receive a second bus bar (e.g., second bus bar 111 as shown).

The assembly 100 can include a suppression resistor 113 disposed between the first housing 101 and the second housing 107, and in electrical communication with the first housing 101 and the second housing 107 to provide an electrical pathway between first housing 101 and the second housing 107. For example, the electrical pathway through the suppression resistor 113 can be a path of least resistance between the first housing 101 and the second housing 107.

The first housing 101 can be made of metal or any other suitable material. For example, the first housing 101 can be made of aluminum. The first housing 101 can be uncoated (i.e., uninsulated), for example.

The second housing 107 can be made of metal and can include a coating (e.g., on an outer surface thereof) such that direct contact with the shaft (and/or the first housing 101) does not electrically connect the shaft to the second housing 107 (and/or the second housing 107 to the first housing 101). The metal can be aluminum and the coating can be a dielectric, for example (e.g., applied via Electric Phosphorus Deposition, HML, or any suitable process). It is contemplated that an inner surface of the second bus bar aperture 109 may not be insulated such that a bus bar inserted therein is electrically connected to the second housing 107. Any other suitable material for the second housing 107 (e.g., uncoated ceramic) and/or any coating thereof is contemplated herein, as long as an electrical pathway is made or exists through the suppression resistor to the first housing 101.

An insulating washer 115 can be disposed between and in contact with the first housing 101 and the second housing 107, e.g., to at least provide abrasion resistance to protect the coating of the second housing 107. The insulating washer 115 can provide additional electrical insulation between the first housing 101 and the second housing 107 (e.g., to assist in defining a path of least resistance through the suppression resistor 113. The insulating washer 115 can be made of polyimide film, for example.

The second housing 107 can include a radial aperture 117 defined from a center of the second housing 107 to an outer surface of the second housing 107, for example. Any other suitable radial aperture 117 is contemplated herein. The first housing 101 can include a tab 119 extending axially therefrom. The tab 119 can define the first bus bar connection aperture 103, e.g., as shown, and can be configured to insert into the radial aperture 117 of the second housing 107, e.g., to axially align the first bus bar aperture 105 and the second bus bar aperture 109 (e.g., such that the bus bars 105, 111 can be substantially co-planar as shown).

As shown, the assembly 100 can define a central aperture therethrough, e.g., through each component of the assembly 100. Any suitable other apertures in one or more components of the assembly 100 are contemplated herein.

Figure 5:
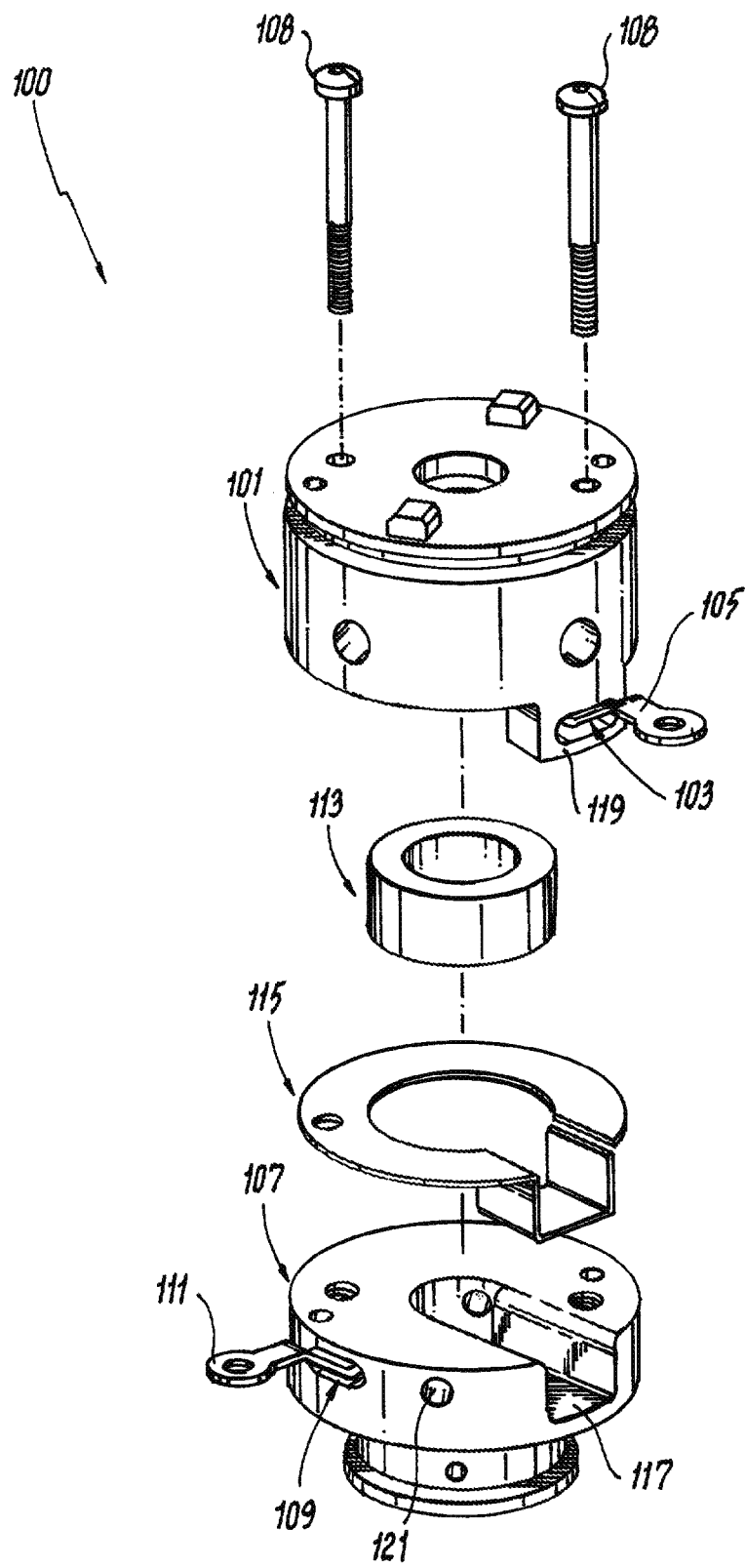
FIG. 5 is an exploded view of the embodiment of FIG. 1.

The suppression resistor 113 can be at least partially (e.g., fully as shown) encased within the first housing 101 and the second housing 107. In certain embodiments, the suppression resistor 113 can be a ceramic hollow cylinder. The assembly 100 can include a first bus bar 105 disposed in the first bus bar aperture 103 and a second bus bar 111 inserted in the second bus bar aperture 109, e.g., as shown in FIG. 5. In certain embodiments, the second housing 121 can include a screw mount hole 121 configured to receive a screw to fix the assembly 100 to the shaft (not show).

In certain embodiments, the assembly 100 may have any suitable additional components (e.g., a Bellville washer between housings to provide positive contact) as appreciated by those having ordinary skill in the art in view of this disclosure. In certain embodiments, the assembly 100 may not include additional components.

A rotor assembly for an electrical machine can include a rotor (e.g., a shaft as disclosed above), a rectifier diode pack (not shown) disposed in the rotor, and a rotating resistor assembly, e.g., 100 disposed in the rotor and in electrical communication with the rectifier diode pack. The rotating resistor assembly, e.g., 100 can be any suitable assembly as disclosed herein. Any other suitable components as appreciated by those having ordinary skill in the art.

Certain embodiments can include a positive and negative rail (housings), e.g., made from aluminum. The positive rail (e.g., second housing) can be coated with an insulating material. The high impedance resistor of traditional assemblies can be eliminated because the negative rail, e.g., the first housing, can be supported by the shaft making a direct ground connection.

Embodiments can be a three or four piece assembly that utilizes the housings as the electrical conducting paths. In embodiments with only two housings halves, one housing can be insulated and the other housing can form the grounding path. Embodiments allow for cost reduction, improved manufacturing by eliminating materials of concern, increased reliability by eliminating solder/braze joints with mechanical connections, and part count reduction.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A rotating resistor assembly for use in a rotating shaft of an electrical machine, comprising:
    a first housing configured to contact the rotating shaft and be grounded to the rotating shaft, the first housing comprising a first bus bar connection aperture configured to receive a first bus bar, wherein the first housing is made of metal;
a second housing configured to connect to the first housing, wherein the second housing is configured to be insulated from the rotating shaft and to be insulated from direct electrical connection with the first housing, the second housing comprising a second bus bar connection aperture configured to receive a second bus bar, wherein the second housing is made of metal and includes coating such that direct contact with the shaft does not electrically connect the shaft to the second housing, wherein the first housing is uncoated; and
a suppression resistor disposed between the first housing and the second housing and in electrical communication with the first housing and the second housing to provide an electrical pathway between first housing and the second housing.

2. The assembly of claim 1, wherein the first housing is made of aluminum.

3. The assembly of claim 1, wherein the metal is aluminum and the coating is a dielectric.

4. The assembly of claim 1, further comprising an insulating washer disposed between and in contact with the first housing and the second housing to at least provide abrasion resistance to protect the coating of the second housing.

5. The assembly of claim 4, wherein the insulating washer is made of polyimide film.

6. The assembly of claim 1, wherein the second housing includes a radial aperture defined from a center of the second housing to an outer surface of the second housing.

7. The assembly of claim 6, wherein the first housing includes a tab extending axially therefrom, wherein the tab defines the first bus bar connection aperture and is configured to insert into the radial aperture of the second housing to axially align the first bus bar connection aperture and the second bus bar connection aperture.

8. The assembly of claim 1, wherein the suppression resistor is at least partially encased within the first housing and the second housing.

9. The assembly of claim 8, wherein the suppression resistor is a ceramic hollow cylinder.

10. The assembly of claim 1, further comprising a first bus bar disposed in the first bus bar connection aperture and a second bus bar inserted in the second bus bar connection aperture.

11. The assembly of claim 1, wherein the second housing includes a radial aperture defined from a center of the second housing to an outer surface of the second housing.

12. The assembly of claim 11, wherein the first housing includes a tab extending axially therefrom, wherein the tab defines the first bus bar connection aperture and is configured to insert into the radial aperture of the second housing to axially align the first bus bar connection aperture and the second bus bar connection aperture.

13. A rotor assembly for an electrical machine, comprising:
a rotor;
a rectifier diode pack disposed in the rotor; and
a rotating resistor assembly disposed in the rotor and in electrical communication with the rectifier diode pack, comprising:
a first housing configured to contact the rotating shaft and be grounded to the rotating shaft, the first housing comprising a first bus bar connection aperture configured to receive a first bus bar to connect to the rectifier diode pack, wherein the first housing is made of metal;
a second housing configured to connect to the first housing, wherein the second housing is configured to be insulated from the rotating shaft and to be insulated from direct electrical connection with the first housing, the second housing comprising a second bus bar connection aperture configured to receive a second bus bar to connect to the rectifier diode pack, wherein the second housing is made of metal and includes coating such that direct contact with the shaft does not electrically connect the shaft to the second housing, wherein the first housing is uncoated; and
a suppression resistor disposed between the first housing and the second housing and in electrical communication with the first housing and the second housing to provide an electrical pathway between first housing and the second housing.

14. The assembly of claim 13, wherein the first housing is made of aluminum.

15. The assembly of claim 13, wherein the metal is aluminum and the coating is a dielectric.

16. The assembly of claim 13, further comprising an insulating washer disposed between and in contact with the first housing and the second housing to at least provide abrasion resistance to protect the coating of the second housing.

17. A rotating resistor assembly for use in a rotating shaft of an electrical machine, comprising:
a first housing configured to contact the rotating shaft and be grounded to the rotating shaft, the first housing comprising a first bus bar connection aperture configured to receive a first bus bar;
a second housing configured to connect to the first housing, wherein the second housing is configured to be insulated from the rotating shaft and to be insulated from direct electrical connection with the first housing, the second housing comprising a second bus bar connection aperture configured to receive a second bus bar, wherein the second housing includes a radial aperture defined from a center of the second housing to an outer surface of the second housing, wherein the first housing includes a tab extending axially therefrom, wherein the tab defines the first bus bar connection aperture and is configured to insert into the radial aperture of the second housing to axially align the first bus bar connection aperture and the second bus bar connection aperture; and
a suppression resistor disposed between the first housing and the second housing and in electrical communication with the first housing and the second housing to provide an electrical pathway between first housing and the second housing.

* * * * *